United States Patent
Stack et al.

(10) Patent No.: US 7,159,916 B2
(45) Date of Patent: Jan. 9, 2007

(54) VEHICLE INSTRUMENT PANEL ASSEMBLY

(75) Inventors: John Stack, Shelby Township, MI (US); Robert M. Schmidt, Livonia, MI (US)

(73) Assignee: Lear Corporation, Southfield, MI (US)

( * ) Notice: Subject to any disclaimer, the term of this patent is extended or adjusted under 35 U.S.C. 154(b) by 104 days.

(21) Appl. No.: 10/905,367

(22) Filed: Dec. 30, 2004

(65) Prior Publication Data
US 2006/0145497 A1 Jul. 6, 2006

(51) Int. Cl.
*B62D 25/14* (2006.01)
*G11B 17/022* (2006.01)

(52) U.S. Cl. ............... 296/24.34; 296/70; 180/90; 720/646; 720/616

(58) Field of Classification Search ........... 296/70, 296/24.34, 37.12; 180/90; 720/616, 646, 720/647
See application file for complete search history.

(56) References Cited

U.S. PATENT DOCUMENTS

| | | | |
|---|---|---|---|
| 5,084,855 A | | 1/1992 | Kobayashi et al. |
| 5,200,874 A | * | 4/1993 | Ito ........................ 361/627 |
| 5,793,728 A | * | 8/1998 | Selby et al. ................ 720/676 |
| 6,388,881 B1 | * | 5/2002 | Yamauchi et al. .......... 361/704 |
| 6,441,510 B1 | | 8/2002 | Hein et al. |
| 6,603,083 B1 | * | 8/2003 | Amari et al. ............... 200/5 D |
| 6,628,245 B1 | * | 9/2003 | Ogawa et al. ................ 345/7 |
| 2003/0161240 A1 | | 8/2003 | Park et al. |
| 2003/0161241 A1 | | 8/2003 | Park et al. |
| 2004/0145208 A1 | | 7/2004 | Kapteyn |
| 2006/0061125 A1 | * | 3/2006 | Schmidt et al. ............ 296/70 |

\* cited by examiner

*Primary Examiner*—D. Glenn Dayoan
*Assistant Examiner*—Greg Blankenship
(74) *Attorney, Agent, or Firm*—Brooks Kushman P.C.

(57) ABSTRACT

A vehicle instrument panel assembly includes a console provided in a center stacking area receiving one or more vehicle components including a media player. A trim bezel configured for use with the one or more vehicle components is secured to the console. An alignment mechanism cooperates with the media player and an opening in the trim bezel to load and unload removable media. The alignment mechanism includes a load funnel securable adjacent an opening in the media player and an eject funnel cooperating with an opening in the trim bezel.

18 Claims, 4 Drawing Sheets

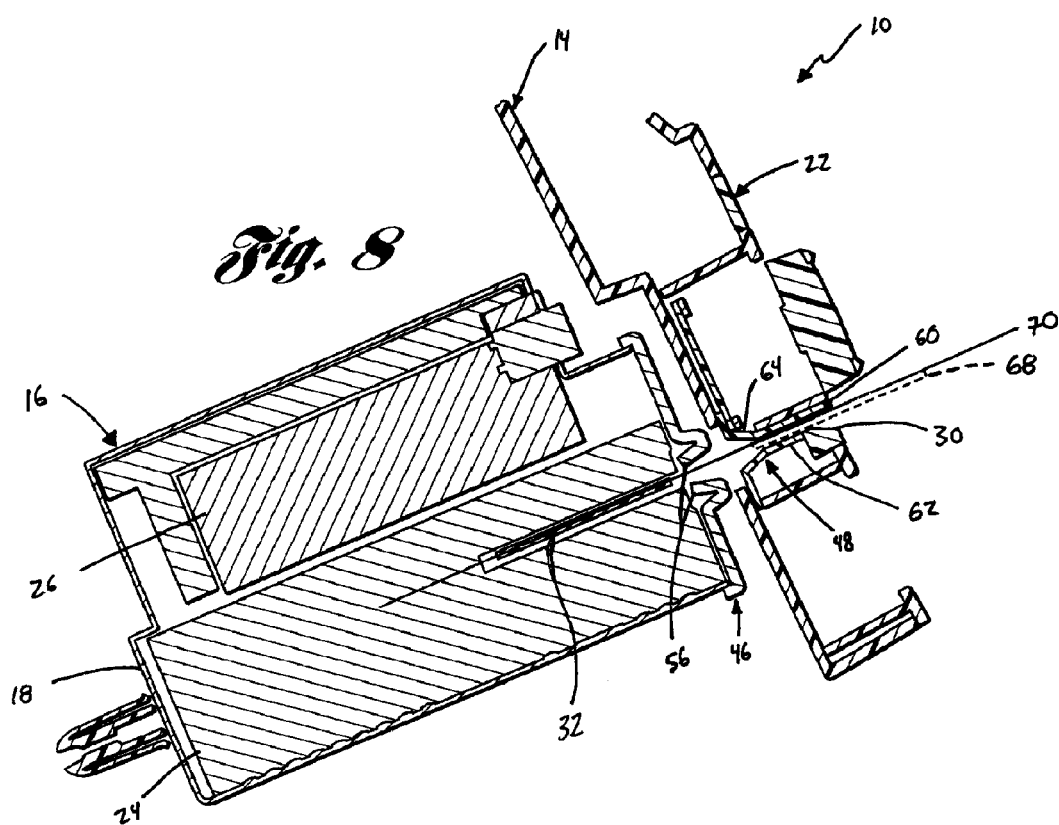
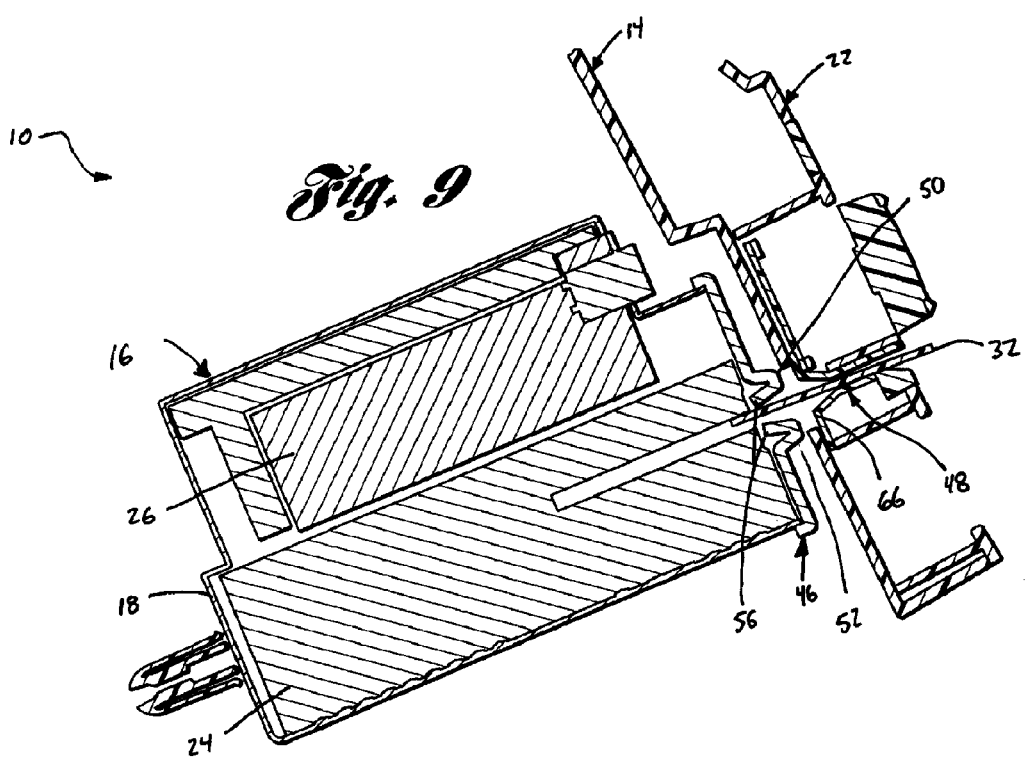

VEHICLE INSTRUMENT PANEL ASSEMBLY

BACKGROUND OF THE INVENTION

1. Field of the Invention

One aspect of the present invention relates to a media alignment device for use with an integrated vehicle console assembly.

2. Background Art

Customarily, vehicle components, for example information, environmental, and entertainment systems, are incorporated into the center of a vehicle instrument panel, which is commonly referred to as a center stack area. For example, numerous vehicle components can be stacked, such as radio and heating ventilation and air conditioning (HVAC) systems and their respective controls. Typically, other components can also stacked, such as a clock, cassette player, compact disc player, etc, with their respective controls exposed for use by a vehicle driver or passenger.

An increasing amount of vehicle components, such as compact disc changers, digital video disc (DVD) players and navigation systems, are offered as vehicle options. In certain circumstances, the center stack area cannot be equipped with every vehicle component option requested by an individual since the stacking space is limited. This problem can be partially alleviated by positioning the actual components elsewhere in the vehicle or mounting the electronic controls on the surface of the center stack area.

Many manufacturers avoid complete redevelopment of the center stack area receiving and positioning the vehicle components when the vehicle instrument panel assembly is redesigned. However, providing accurate fit and finish of the face plates interfacing with the components and the instrument panel is problematic. As shown in FIG. 1, a typical vehicle instrument panel assembly includes a vehicle component securable within a center stack area and a floating face plate mounted to front portion of the vehicle component. The floating face plate allows adjustment of the plate within the opening in the instrument panel to align with the vehicle component.

While this allows for accurate alignment of the face plate to the vehicle component, significant gaps between the face plate and the instrument panel may occur based on the position of the media device in the center stack chassis. These gaps may allow light behind the instrument panel to show through into the passenger compartment. Further, the appearance and number of cut lines from the face plates in the center stack may detract from the overall fit and finish of the instrument panel assembly.

It would be desirable to provide a vehicle instrument panel assembly incorporating a console which increases the surface area for vehicle controls and/or devices. It is also desirable to provide an alignment arrangement for a media device mounted within the console which ensures proper alignment of a removable media into the media device. It is also desirable to provide an instrument panel assembly having a reduced center stack area incorporating a variety of integrated switches.

SUMMARY OF THE INVENTION

One aspect of the present invention overcomes the above-referenced problems associated with prior instrument panel assemblies by providing a vehicle instrument panel assembly having a console provided in a center stacking area of the assembly. One or more vehicle components including a media player are positioned adjacent the console. A trim bezel configured for use with the one or more vehicle components is mounted to the console and receives a plurality of vehicle system controls, including heating ventilation and air conditioning controls and audio system controls.

An alignment mechanism is disposed between and cooperates with the media player and trim bezel to load and unload removable media. The alignment mechanism includes a load funnel and an eject funnel. The load funnel is securable adjacent the media player having an upper lip, an opposing lower lip and a passage formed therebetween. The eject funnel cooperates with an opening in the trim bezel and includes an elongate portion including an upper lip, an opposing lower lip and a channel formed therebetween. Both the load funnel and eject funnel include angled inner surfaces configured to direct the removable media towards respective channels or passages in the funnels.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 8 is a cross-sectional view along line 8—8 of FIG. 3 showing the vehicle instrument panel assembly utilizing the alignment mechanism; and FIG. 9 is a cross-sectional view of the instrument panel assembly illustrating the unloading of removable media from the vehicle component through the alignment mechanism in accordance with the present invention.

DETAILED DESCRIPTION OF THE PREFERRED EMBODIMENT(S)

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
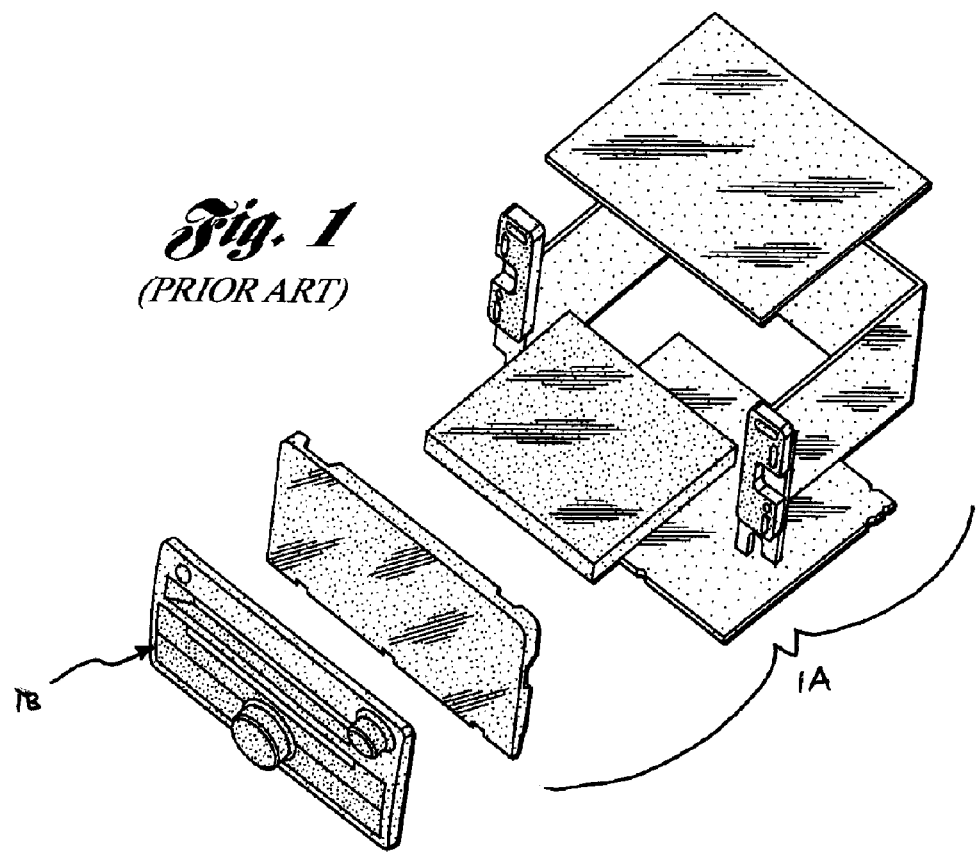
FIG. 1 shows a perspective view of a prior art media device or vehicle component and floating face plate.
Figure 2:
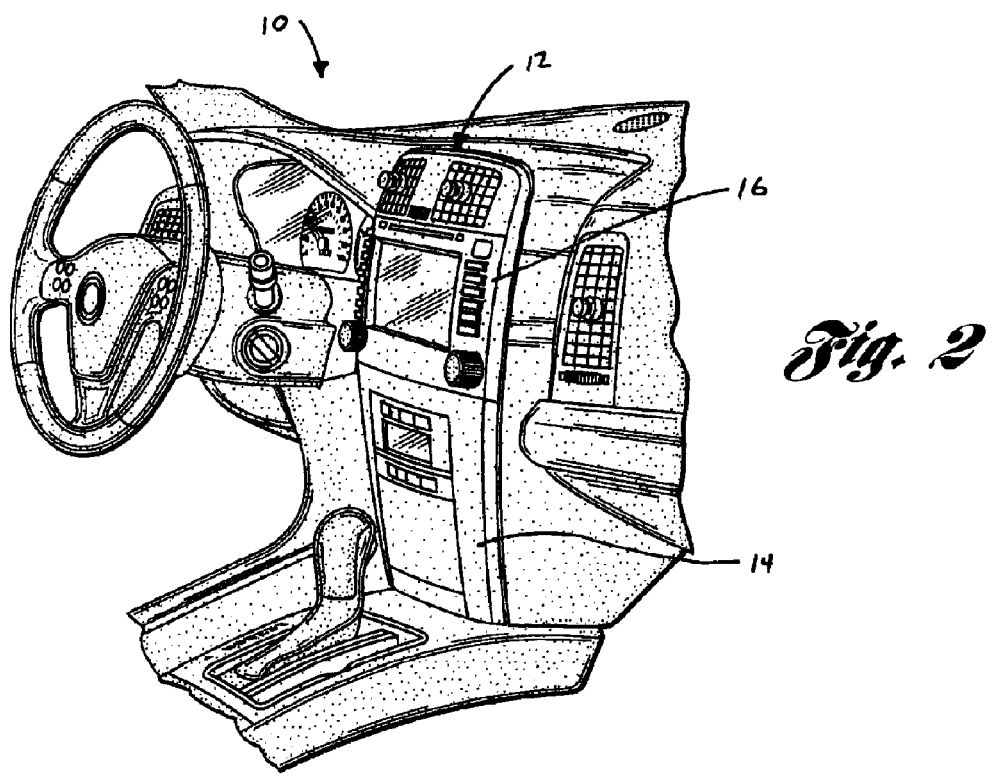
FIG. 2 shows a perspective view of a vehicle instrument panel assembly incorporating one or more vehicle components in accordance with a preferred embodiment of the present invention.

Referring to FIG. 2, a vehicle instrument panel assembly 10 is shown in accordance with a preferred embodiment of the present invention. Instrument panel assembly 10 includes console 12 positioned in a stacking area 14 of instrument panel assembly 10. Stacking area 14 is generally centrally located between the front passenger seats of the vehicle seating area in the instrument panel assembly 10.

Figure 3:
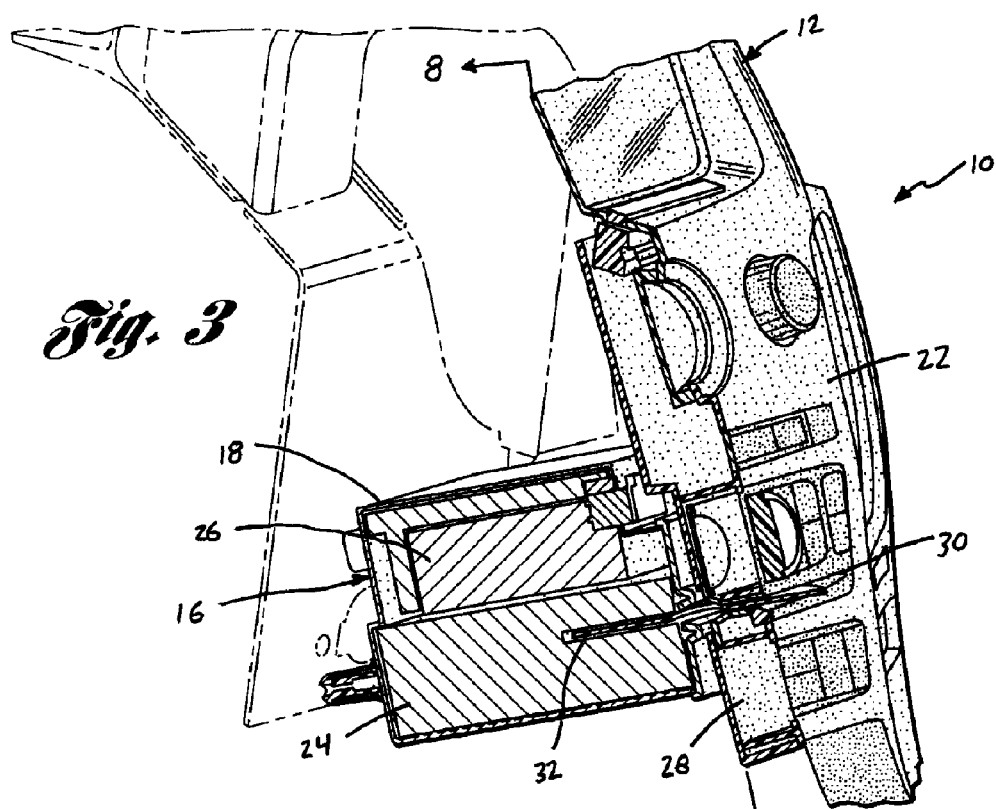
FIG. 3 shows a partial perspective view of the vehicle instrument panel assembly of FIG. 2.

As shown in FIG. 3, console 12 comprises one or more vehicle components 16 securable within a frame or chassis 18. Chassis 18 is preferably a support member configured to support and receive instrument panel assembly 10. Alternatively, chassis 18 may be a support structure securable to the instrument panel 10 or vehicle frame. An opening provided in the instrument panel assembly 10 cooperates with chassis 18 to receive vehicle components 16. One or more trim bezels or face plates 22 are received in console 12. Trim bezels 22 cooperate with vehicle components 16 to allow vehicle occupants to control a variety of functions of each component 16 while providing a finish surface for the passenger compartment.

Figure 4:
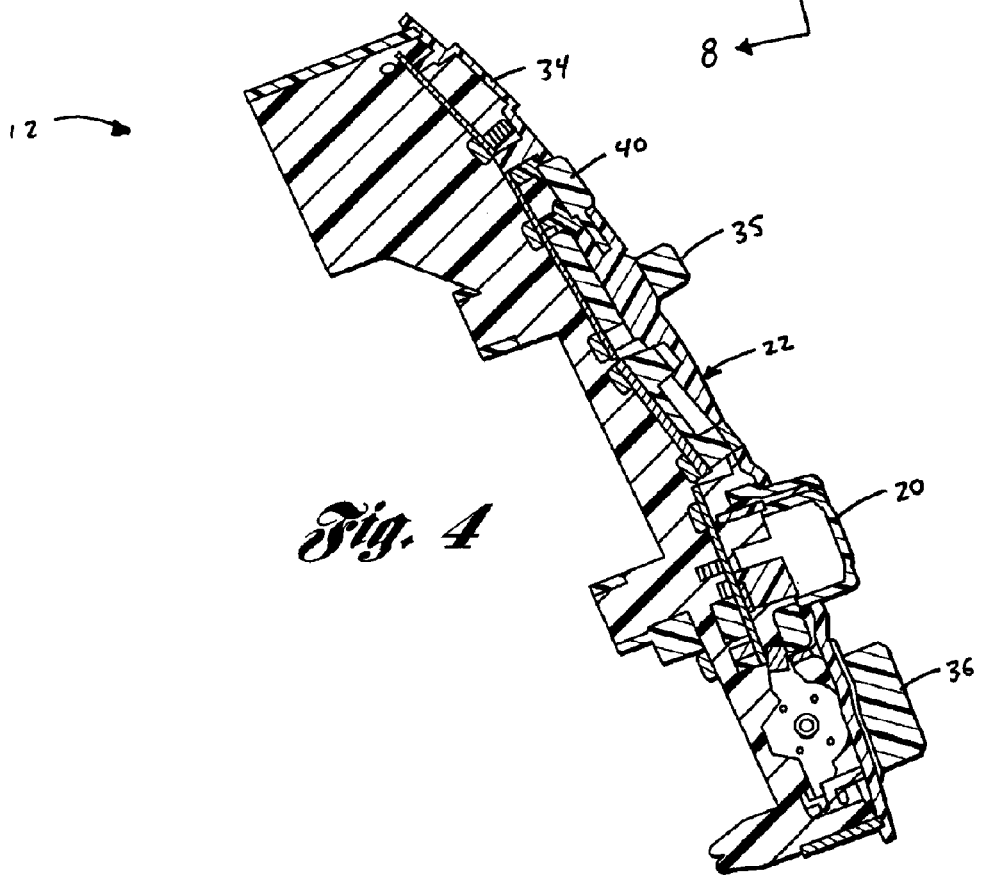
FIG. 4 shows a side view of the center stack arrangement securable to the vehicle instrument panel assembly.
Figure 5:
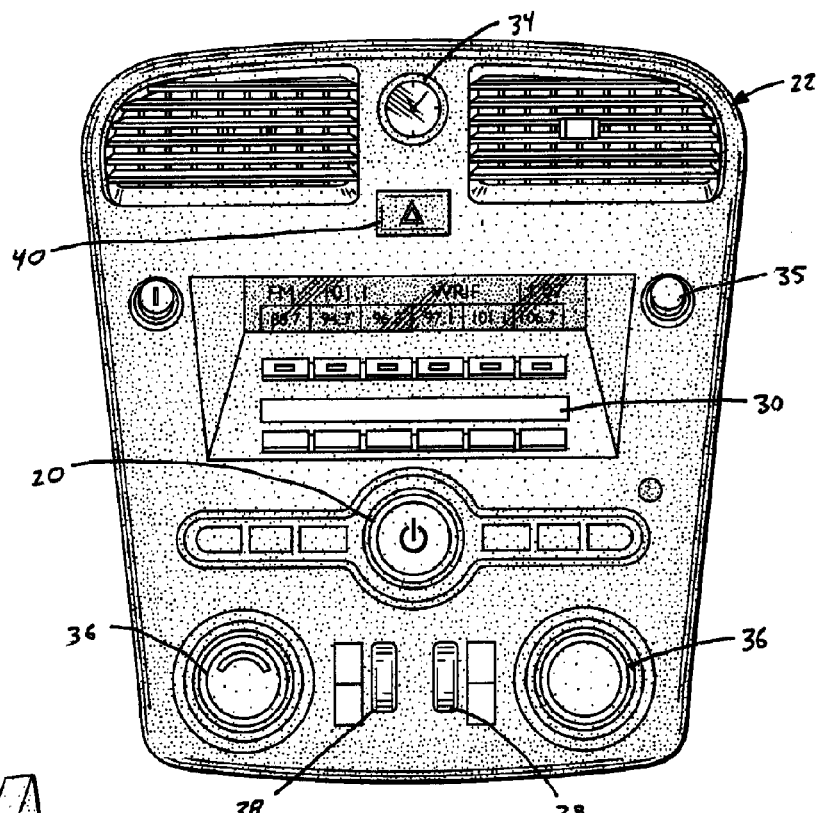
FIG. 5 shows a front plan view of a trim bezel securable to a vehicle component.

As depicted in FIGS. 3–5, the primary vehicle components include a media player 24, radio 26 and a HVAC unit 28. Media player 24 receives and reads a removable media 32, such as a compact disc or digital video disc. It is contemplated that a vehicle may include any number of vehicle components, such as compact disc (CD) players, radios, digital video disc (DVD) players, navigation systems, heating ventilation and air conditioning (HVAC) systems, vents, control gauges and clocks.

Trim bezel 22 may be configured in a variety of ways based on manufacturer preference and component installation. Trim bezel 22 includes a slot 30 configured to receive and feed the removable media 32 into the media player 24. Trim bezel 22, as shown in FIG. 5, includes other components such as a clock 34 and control switches, including multifunction 20, radio 35 and HVAC control switches 36, defroster controls 38 and hazard light controls 40. It is also contemplated that other controls and switches, such as rear wiper controls and electrical interface ports, such as recharging ports for cell phones and personal digital assistants may be incorporated into the trim bezel 22.

Figure 6:
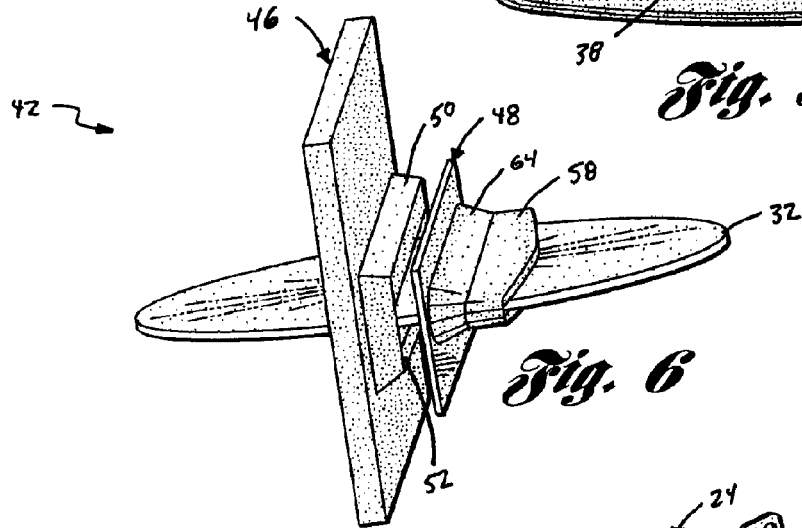
FIG. 6 shows a perspective view of an alignment mechanism for use with a vehicle component installed in the vehicle instrument panel assembly.
Figure 7:
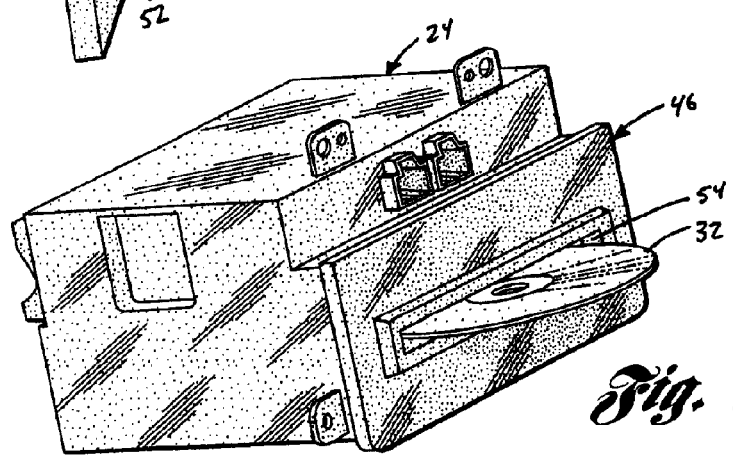
FIG. 7 shows a perspective view of a vehicle component having the adjustment mechanism secured thereto in accordance with the present invention.

Referring now to FIGS. 6 and 7, an alignment mechanism 42 is provided in the instrument panel assembly to assist in the loading and unloading of media 32 into the media player 24. Alignment mechanism 42 includes a load funnel 46 secured adjacent opening 44 in media player 24 and an eject funnel 48 cooperating with slot in trim bezel. Load funnel 46 includes an upper lip 50 and an opposing lower lip 52 forming a passage 54 therethrough. Opposing upper and lower lips 52, 54 of load funnel 46 each include an angled inner surface slanted towards passage 54. Angled surfaces are designed to direct removable media 32 through passage 54 into opening 44 in media player 24 even if the trim bezel and media player 24 are misaligned. A description of this interaction follows below.

Eject funnel 48 is positioned adjacent the opening or slot in the trim bezel. Eject funnel 48 includes an elongate receiving portion 58 extending from a housing portion through the opening in trim bezel to receive removable media 32. Elongate receiving portion 58 includes an upper lip, an opposing lower lip and a channel formed therebetween. The opposing upper and lower lips each include an angled inner surface 64 extending from housing portion towards the channel. Angled inner surfaces 64 of eject funnel 48 cooperate to guide removable media 32 through slot in trim bezel toward load funnel 46. Elongate portion 58 terminates at an exit portion cooperating with the upper and lower lips 50, 52 of the load funnel 46.

Referring now to FIGS. 8 and 9, use of the dual funnel alignment mechanism in instrument panel assembly 10 is described in greater detail. Vehicle components 16 such as media player 24 and radio 26 are assembled in chassis 18. Depending on vehicle tolerances, components 16 may be adjusted vertically in the chassis up to about 1.6 millimeters (mm) from a standard mounting position. Adjustment and securement of the components 16 in chassis 18 may cause trim bezel 22 to be out of alignment once positioned on the center stacking area 14 of console 12.

To compensate for this misalignment, it is contemplated that trim bezel 22 may be adjusted within the opening in the center stacking area 14 of console 12 to allow for realignment of controls and openings on bezel 22 with the vehicle components 16 in chassis 188. In one aspect of the present invention, the trim bezel 22 may be adjusted up to about 0.6 millimeters (mm) relative to a standard mounting position such that slot 30 in trim bezel 22 aligns with opening 44 in media player 24. Alignment mechanism 42 cooperates with trim bezel 22 and vehicle components 16 to ensure that removable media 32 is loaded and unloaded into components 16 without damage to either media 32 or components 16.

Removable media, shown prior to loading in phantom by reference numeral 68, is fed through slot or opening 30 in trim bezel 22 into a use position in media player 24. It is contemplated that slot 30 in trim bezel 22 may be misaligned with media player 24 in chassis 18. The alignment mechanism functions as a loading guide for removable media 32 as it passes through trim bezel 22 into media player 24. As shown in FIGS. 8 and 9, opposing upper and lower lips 60, 62 of the elongate portion 58 of eject funnel 48 extend into slot 30 in trim bezel 22 to receive media 32. Exit portion 66 of eject funnel 48 is aligned with the load funnel 46 to pass removable media 32 therebetween.

Load funnel 46 is secured to a forward portion of media player 24. If the opening 30 in trim bezel 22 is offset from the opening in media player 24, angled surfaces 56 of the opposing upper and lower lips 50, 52 of load funnel 46 cooperate with exit portion 66 of eject funnel 48 to guide removable media 32 through lips 50, 52 in load funnel 46 into media player 24. Load funnel 46 allows the removable media to enter media player 24 at an angle above or below about 0.9 degrees from load axis 70. This angle ensures proper loading of the removable media 32 while avoiding either damage to the media or jamming of the media in the media player 24 or between the trim bezel 22 and media player 24.

FIG. 9 illustrates the ejection of removable media 32 from media player 24 through trim bezel 22. As removable media 32 is ejected from media player 24, it is guided toward eject funnel 48 by the upper and lower lips 50, 52 of load funnel 46. As media 32 enters the eject funnel 48, angled surfaces 64 of upper and lower lips 60, 62 of eject funnel 48 guide media 32 into the elongate portion 58. Media 32 proceeds through the elongate portion 58 and exits out slot 30 in trim bezel 22 to be removed by an occupant of the vehicle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle instrument panel assembly comprising:
a console portion;
one or more vehicle components including a media player positioned adjacent the console portion;
a trim bezel configured for use with the one or more vehicle components securable to the console portion; and
an alignment mechanism disposed between the media player and trim bezel configured to load and unload removable media to the media player, the alignment mechanism including a load funnel securable adjacent the media player having opposing upper and lower lips each including angled inner surfaces and a passage formed therebetween and an eject funnel mountable adjacent an opening in the trim bezel,
wherein the alignment mechanism cooperates with the media player and opening in the trim bezel to load and unload the removable media from the media player.

2. The vehicle instrument panel assembly of claim 1 wherein the angled inner surfaces of the upper and lower lips of the load funnel are configured to direct the removable media toward the passage in the load funnel.

3. The vehicle instrument panel assembly of claim 1 wherein the load funnel is secured to media player such that the passage in the load funnel is aligned with an opening in the media player.

4. The vehicle instrument panel assembly of claim 1 wherein the eject funnel further comprises an elongate portion extending from a housing, the elongate portion having an upper lip, an opposing lower lip and a channel formed therebetween.

5. The vehicle instrument panel assembly of claim 4 wherein the upper and lower lips of the elongate portion of the eject funnel each include angled inner surfaces configured to direct the removable media toward the channel in the eject funnel.

6. The vehicle instrument panel assembly of claim 4 wherein the elongate portion of the eject funnel extends through the opening in the trim bezel and the housing portion cooperates with the load funnel to load and unload the removable media.

7. The vehicle instrument panel assembly of claim 1 wherein the trim bezel receives a plurality of vehicle system controls.

8. The vehicle instrument panel assembly of claim 7 wherein the plurality of vehicle system controls include heating ventilation and air conditioning and radio controls.

9. The vehicle instrument panel assembly of claim 7 wherein the plurality of vehicle system controls include navigation system controls.

10. The vehicle instrument panel assembly of claim 1 wherein the media player is a compact disc player.

11. The vehicle instrument panel assembly of claim 1 wherein the media player is a digital video disc player.

12. The vehicle instrument panel assembly of claim 1 wherein the media player is a digital video disc navigation system.

13. A vehicle instrument panel assembly comprising:
a console portion;
one or more vehicle components including a media player positioned adjacent the console portion;
a trim bezel configured for use with the one or more vehicle components securable to the console portion; and
an alignment mechanism cooperating with the media player and trim bezel to load and unload removable media, the alignment mechanism including a load funnel securable adjacent an opening in the media player having an upper lip, an opposing lower lip and a passage formed therebetween and an eject funnel cooperating with an opening in the trim bezel having an elongate portion including an upper lip, an opposing lower lip and a channel formed therebetween
wherein the elongate portion of the eject funnel extends through the opening in the trim bezel and the housing portion cooperates with the load funnel to load and unload the removable media.

14. The vehicle instrument panel assembly of claim 13 wherein the upper and lower lips of the load funnel each include angled inner surfaces configured to direct the removable media toward the passage in the load funnel.

15. The vehicle instrument panel assembly of claim 13 wherein the upper and lower lips of the elongate portion of the eject funnel extend from a housing portion and each include angled inner surfaces configured to direct the removable media toward the channel in the eject funnel.

16. The vehicle instrument panel assembly of claim 13 wherein the trim bezel receives a plurality of vehicle system controls, including heating ventilation and air conditioning and radio controls.

17. An alignment mechanism configurable for loading and unloading removable media between a media player and a trim bezel securable to a vehicle instrument panel assembly, the alignment mechanism comprising:
a load funnel having an upper lip and an opposing lower lip defining a passage therebetween, wherein the opposing upper and lower lips each include angled inner surfaces configured to direct the removable media toward the passage; and
an eject funnel having a housing and an elongate portion extending from a housing, the elongate portion having an upper lip, an opposing lower lip and a channel formed therebetween, wherein the opposing upper and lower lips each include angled inner surfaces configured to direct the removable media toward the channel in the eject funnel.

18. The alignment mechanism of claim 17 wherein the load funnel is secured to the media player to align the passage in the load funnel with an opening in the media player and the eject funnel extends through the opening in the trim bezel.

* * * * *